United States Patent [19]
Martin

[11] 3,901,036
[45] Aug. 26, 1975

[54] TWO FLUID SOLAR BOILER

[76] Inventor: William A. Martin, 804 Via Bella Maria, San Marcos, Calif. 92069

[22] Filed: Nov. 16, 1973

[21] Appl. No.: 416,417

[52] U.S. Cl. .................. 60/641; 60/659; 126/270; 126/271
[51] Int. Cl. .............................................. F03g 7/02
[58] Field of Search ....... 60/641, 659; 126/270, 271

[56] References Cited
UNITED STATES PATENTS

| | | | |
|---|---|---|---|
| 705,167 | 7/1902 | Walker | 126/271 |
| 748,696 | 1/1904 | Browning, Jr. | 126/271 |
| 784,005 | 2/1905 | Ketchum | 60/26 |
| 984,585 | 2/1911 | McHenry | 60/26 |
| 1,599,481 | 9/1926 | Marcuse | 60/26 |
| 2,920,710 | 1/1960 | Howard | 60/26 UX |
| 3,654,759 | 4/1972 | Abbot | 60/26 |

FOREIGN PATENTS OR APPLICATIONS

| | | | |
|---|---|---|---|
| 718,175 | 9/1965 | Canada | 60/26 |

*Primary Examiner*—Martin P. Schwadron
*Assistant Examiner*—Allen M. Ostrager
*Attorney, Agent, or Firm*—Brown & Martin

[57] ABSTRACT

A boiler for powering fluid pressure motors. The rays from the sun are focused by a lens through a transparent oil primary heat transfer medium and onto a heat absorber. The heat directly absorbed by the oil and by contact with the heat absorber is circulated by a thermo-siphon through a heat exchanger. The heat exchanger transfers heat and raises the temperature of a hydrocarbon fluid utilized as the secondary heat exchange medium. The expanded hydrocarbon powers a fluid pressure operated motor and is returned from the low pressure side of the motor to condensers after which it is compressed and returned to the heat exchanger in a closed cycle operation.

6 Claims, 4 Drawing Figures

TWO FLUID SOLAR BOILER

BACKGROUND OF THE INVENTION

Many devices have been proposed whereby solar energy is converted to perform useful work. The largest emphasis in recent years has been on devices for directly converting solar energy to electricity. These devices frequently comprise large panels of solar cells. However, such devices are capable of converting only a small fraction of the total available energy of the sun, and therefore require large areas to extract meaningful amounts of energy for most terrestrial purposes. Accordingly, they have seen application only where conventional sources of power are unavailable; such as remote areas or in space.

Other devices have been proposed whereby the energy of the sun is concentrated sufficiently to heat a fluid to cause the fluid to expand sufficiently that an increased pressure is produced, whereby a turbine or comparable fluid pressure motor is operated. The efficiency of such a single fluid solar boiler has been sufficiently low that the devices are not practical for general usage. Further, it has not often been practical to operate such devices in a recirculating or closed cycle mode, which results in the utilization of considerable quantities of the working medium. The final deficiency in such solar boilers of the prior art is that they have utilized water as the working fluid, and thus require raising water to a considerable temperature above ambient before there is a pressure increase.

It is therefore desirable to have a solar boiler capable of producing sufficiently high pressures in a working fluid to operate a fluid pressure motor. Particularly where such a device is susceptible to use in closed cycle operations, and where the thermal efficiency of the device permits the production of substantial quantities of power from relatively small area.

SUMMARY OF THE INVENTION

An exemplary embodiment of the invention utilized a transparent lens to focus the solar light energy through a primary heat exchange fluid and onto a heat absorber. The primary heat exchange fluid employed is a substantially transparent oil so that the lens is able to focus a substantial portion of the incident solar energy onto a curved heat absorbing surface. The heat absorber means, comprising the curved surface, is covered with a black coating to absorb and convert a maximum portion of the incident energy into heat, and raise the temperature of the metal forming the heat absorber surface.

The heat absorber means forms the upper surface of a heat exchanger means. The heat exchanger means comprising a plurality of vertical oil passageways in the form of tubes communicating between a lower oil reservoir and an upper oil reservoir between the lens and heat absorber means. The chamber formed surrounding the oil passageways is filled with the secondary heat exchange fluid, which comprises a hydrocarbon that is raised above its vaporization point by the temperatures produced in the solar boiler.

The rate of heat flow from the oil to the hydrocarbon is increased by inducing a thermal siphon action in the boiler container. The thermal siphon is produced by the temperature created on the surface of the heat absorber means adjacent the vertically upper ends of the vertical oil passageways. The oil in contact with this surface is heated and expands, resulting in a convection current flowing upwardly, outwardly, and downwardly, and resulting in the upward flow of oil through the oil passageways; increasing the heat transfer to the hydrocarbon fluid through the walls of the heat exchanger.

Pressurized hydrocarbon fluid produced in the heat exchanger is utilized to drive a fluid pressure motor. The low pressure side of the fluid pressure motor is connected to condensors, which reduce the temperature of the hydrocarbon to near ambient. A compressor then forces the cooled hydrocarbon fluid back into the heat exchanger to complete the closed cycle.

It is therefore an object of the invention to provide a new and improved two fluid solar boiler.

It is another object of the invention to provide a new and improved solar boiler with high thermal efficiency.

It is another object of the invention to provide a new and improved solar boiler than is usable in closed cycle power systems.

It is another object of the invention to provide a new and improved solar boiler that produces high pressures without resorting to extreme temperatures.

It is another object of the invention to provide a new and improved solar boiler that utilizes a stable primary heat exchange fluid and a volatile secondary heat exchange fluid.

It is another object of the invention to provide a new and improved solar boiler that heats a secondary heat exchange fluid directly and through the medium of a primary heat exchange fluid.

Other objects and many attendant advantages of the invention will become more apparent upon the reading of the following detailed description, together with the drawing, in which like reference numerals refer to like parts throughout, and in which.

Figure 1:
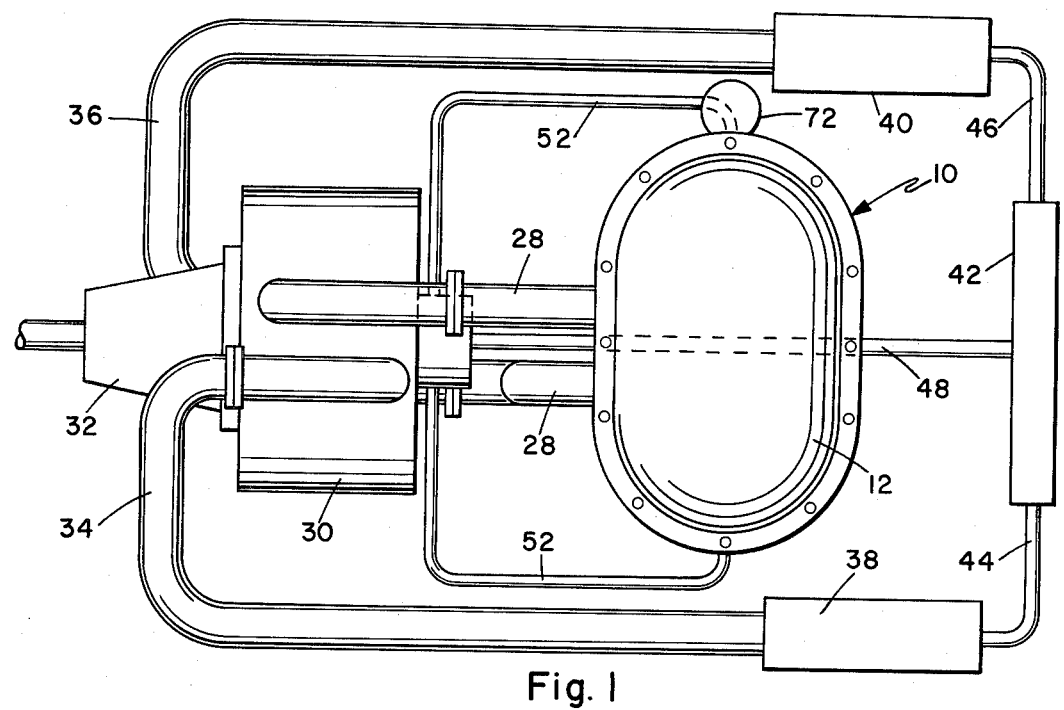
FIG. 1 is a top plan view of a power system incorporating the solar boiler.
Figure 2:
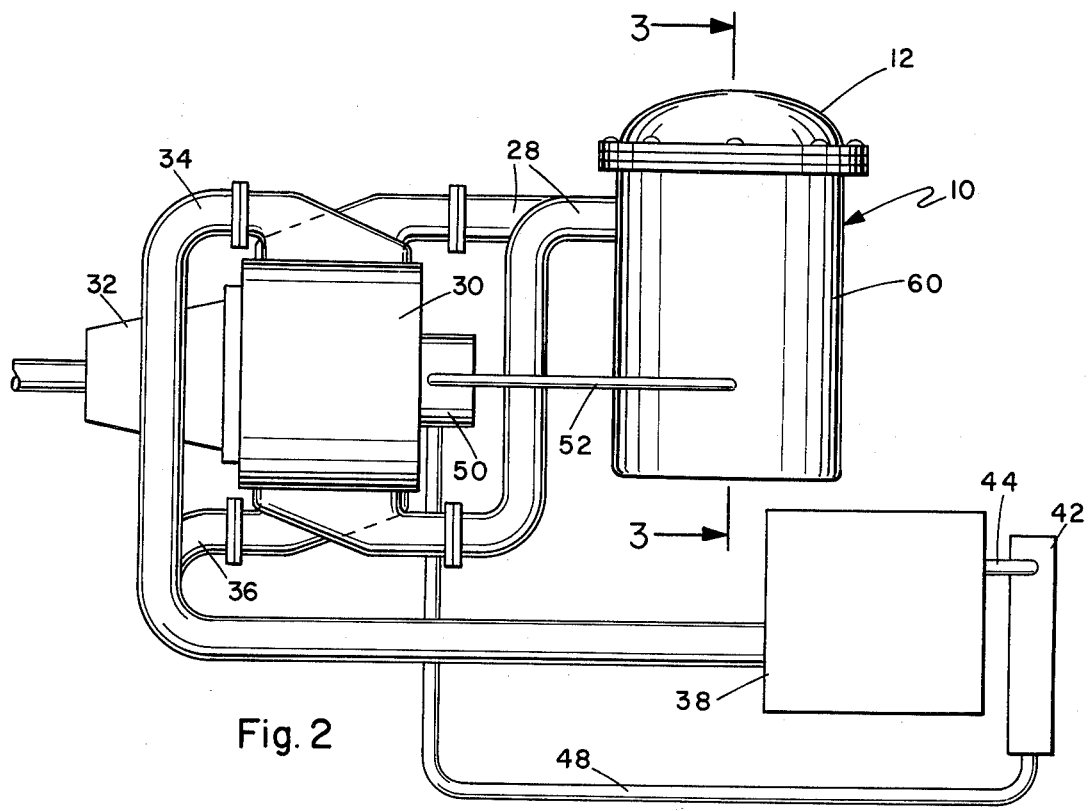
FIG. 2 is a side elevation view of the system.
Figure 3:
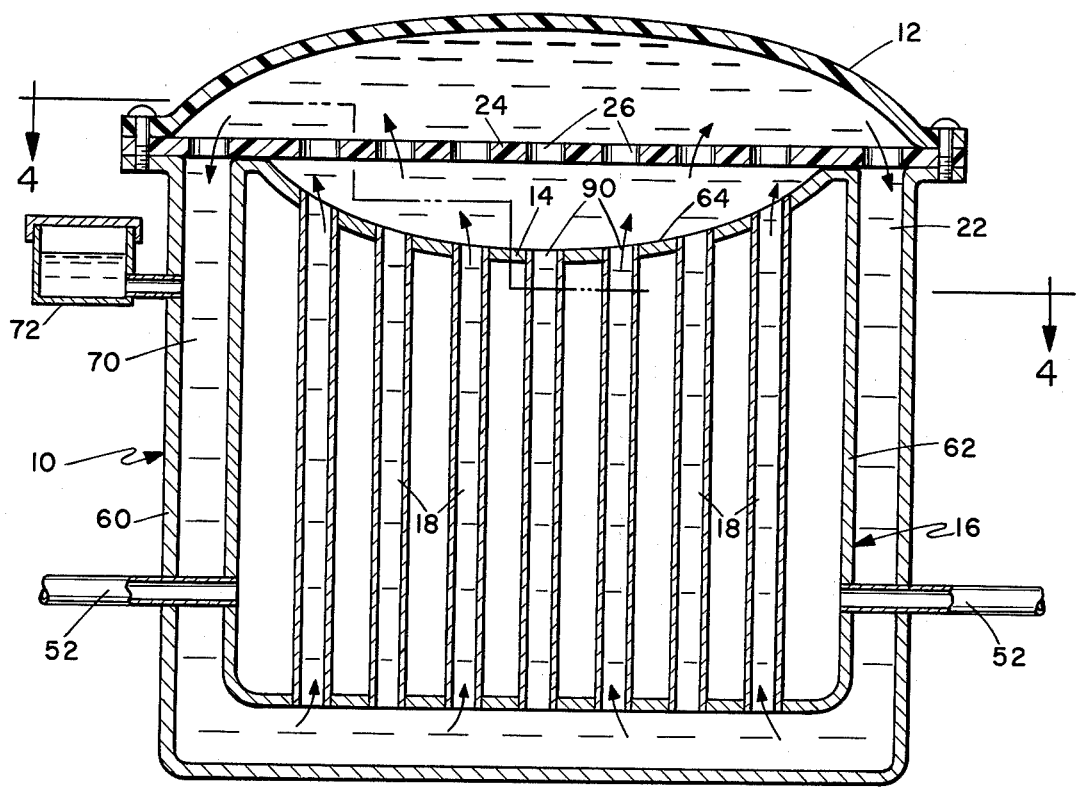
FIG. 3 is an enlarged sectional view taken on line 3—3 of FIG. 2.
Figure 4:
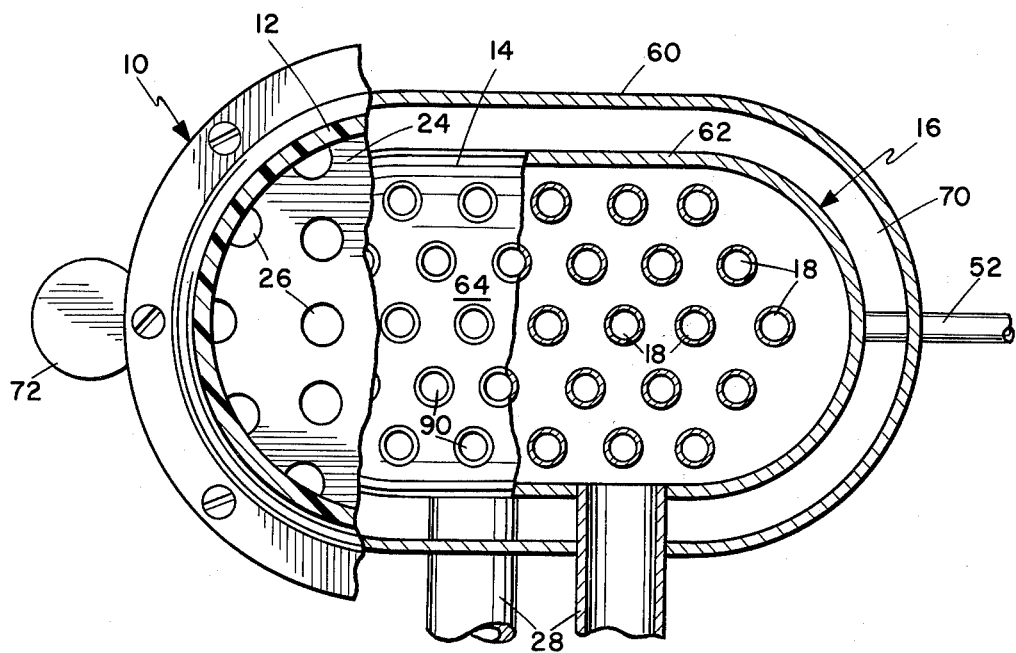
FIG. 4 is a sectional view taken on line 4—4 of FIG. 3.

Referring now to the drawings, there is illustrated a solar boiler according to the invention. A boiler container 60 contains the light transmission lens 12, heat absorbing means 14 and heat exchanger 16. The container 60 is filled with a quantity of primary heat exchange fluid comprising oil 22 which oil fills the lens 12 and circulates throughout the container 60, through holes 26 in the lens plate 24, passageways 18, in the heat exchanger 16, and in annular passageway 70, surrounding the heat exchanger 16. A chamber 72 compensates for the expansion of the oil as it is heated. The oil 22 is transparent, as is the lens plate 24, which allows for the light rays to pass through and fall upon the heat absorbing surface 64 of the heat absorbing means 14. The surface 64 is covered with a black coating to maximize the light absorption and conversion to heat. The heat exchanger 16 includes a casing 62 which encloses the secondary heat exchange fluid of the invention, comprising a hydrocarbon CH Cl $F_2$. This hydrocarbon is commercially available as FREON 21 and is capable of operating at pressures to 1,400 psi.

Pressurized hydrocarbon is ducted from the heat exchanger by conduits 28 which deliver it to a fluid pressure motor 30. The fluid pressure motor may be of any suitable type, such as a piston, turbine, or it may be of the rotary vane type such as is described in greater detail in applicant's copending application entitled "Rotary Vane Type Motor," the contents of which application being hereby incorporated herein by reference. The pressurized hydrocarbon fluid is utilized to drive the motor into rotation, which rotation is controlled by the power transmission mechanism 32. The removal of energy from the high pressure hydrocarbon fluid results in a reduction of its pressure. The low pressure hydrocarbon is exhausted from the motor 30 on lines 34 and 36. The exhaust lines 34 and 36 deliver the low pressure hydrocarbon fluid to the dual primary condensers 38 and 40, where a substantial portion of the remaining heat in the hydrocarbon fluid is removed. The fluid is then delivered via lines 44 and 46 to the secondary condenser 42 where the remaining heat is removed, to reduce the temperature of the hydrocarbon fluid to substantially ambient. Line 48 returns the cooled hydrocarbon fluid to a suitable compressor such as the compresser 50, illustrated in the instant embodiment as being driven from the motor 30. This compresser substantially increases the pressure of the hydrocarbon fluid so that it may be re-injected into the heat exchanger on lines 52.

OPERATION

The apparatus is exposed to the sun's rays. The lens 12 concentrates the rays of the sun and collects incident rays which have been scattered or reflected from the direct path to the sun. The collected and concentrated rays are then focused into the oil 22 which directly converts a portion of the light energy into heat, thereby raising the temperature of the oil. Secondarily, the energy is focused upon the surface 64 of the heat absorber 14. The black coated surface 64 absorbs a substantial portion of the remaining energy which raises the temperature of the metal making up the surface 64. The high temperature metal of the heat absorber serves several functions. A first function is served by the direct transfer by conduction and convection to the oil 22 of a portion of the total heat energy. Secondarily, the interior of the surface 64 transfers heat directly to the secondary heat exchange fluid raising the temperature of that hydrocarbon fluid and increasing its volume and pressure. As a third function, the elevated temperature of the surface 64 heats the oil immediately adjacent the upper openings 90 of the oil transport tubes 18 to a temperature higher than that of the oil generally. The heated oil in this vicinity is therefore made lighter than the surrounding oil and rises. This results in the movement of oil up through the heat exchange tubes in the manner of a thermal siphon. Thus, there is an enhanced heat exchange effect produced by the circulation of the oil up through the tubes and then down around the heat exchange container 62 through the passage 70. This results in the heat exchanger transferring heat to the hydrocarbon fluid, further raising its temperature and pressure. Since the FREON 21 utilized expands greatly when heated, this produces a high internal pressure which is then conveyed via the lines 28 to the intake manifold or comparable apparatus of the motor 30. The high pressure fluid is utilized in driving the motor, and by the removal of energy through the rotation of the motor the fluid is reduced in pressure and temperature and exhausted on lines 34 and 36 to the condensers. The primary condensers 38 and 40 and secondary condenser 42 further reduce the temperature of the fluid to re-condense the hydrocarbon fluid and permit it to be compressed into a liquid by the compressor 50, which also raises the pressure of the fluid sufficiently to inject it into the environment of the heat exchange container 62.

It should be noted that it is possible to provide auxiliary heating means in the form of a conventional burner located in association with the boiler vessel 60 whereby the heat of the sun may be supplemented or replaced as necessary or desirable.

Having described my invention, I now claim:

1. A boiler for producing a source of high pressure fluid from solar energy for use in association with a closed cycle fluid pressure motor, comprising:
a chamber with a primary head exchange fluid,
energy admission means for passing solar energy into said chamber,
absorber means within said chamber and in combination with said primary heat exchange fluid for converting said solar energy into heat energy,
heat exchanger means within said chamber for transferring heat from said primary heat exchange fluid to a secondary heat exchange fluid,
said primary heat exchange fluid comprises substantially solar energy-transparent oil,
whereby said secondary heat exchange fluid develops sufficient pressure to operate said fluid pressure motor.

2. The boiler according to claim 1 wherein:
said energy admission means comprises an oil-filled lens that concentrates solar energy on said absorber means.

3. The boiler according to claim 1 wherein:
at least one condenser is utilized to reduce the temperature and volume of said secondary heat exchange fluid.

4. The boiler according to claim 1 wherein:
said secondary heat exchange fluid comprises $CHClF_2$.

5. A boiler for producing a source of high pressure fluid from solar energy for use in association with a closed cycle fluid pressure motor, comprising,
a chamber with a primary heat exhange fluid,
energy admission means for passing solar energy into said chamber,
absorber means within said chamber and in combination with said primary heat exchange fluid for converting said solar energy into heat energy,
said energy admission means comprises an oil-filled lens that concentrates solar energy on said absorber means,
said absorber means comprising a curved black surface having a first side in contact with said primary heat exchange fluid and a second side incontact with said secondary heat exchange fluid,
heat exchanger means for transferring heat from said primary heat exchange fluid to a secondary heat exchange fluid,
whereby said secondary heat exchange fluid develops sufficient pressure to operate said fluid pressure motor.

6. A boiler for producing a source of high pressure fluid from solar energy for use in association with a closed cycle fluid pressure motor, comprising:
a chamber with a primary heat exchange fluid,
energy admission means for passing solar energy into said chamber, absorber means within said chamber and in combination with said primary head exchange fluid for converting said solar energy into heat energy, heat exchanger means for transferring heat from said primary heat exchange fluid to a secondary heat exchange fluid, said heat exchanger means comprising a plurality of vertically extending passageways for said first heat exchange fluid, said passageways terminating at their upper ends adjacent said absorber means, and passageways and said absorber means forming a thermal syphon to increase the heat flow through said heat exchanger, whereby said secondary heat exchange fluid develops sufficient pressure to operate said fluid pressure motor.

* * * * *